United States Patent Office 3,290,278
Patented Dec. 6, 1966

3,290,278
RECOVERY OF POLY(BUTENE-1)
Billy D. Rice, Pasadena, and Thomas G. Reed, Jr., La Porte, Tex., assignors to Petro-Tex Chemical Corporation, Houston, Tex., a corporation of Delaware
No Drawing. Filed Oct. 1, 1963, Ser. No. 312,862
4 Claims. (Cl. 260—93.7)

This invention relates to a method for separating solid poly(butene-1) from a solution of polymer and solvent. More particularly, the invention relates to a process for obtaining essentially solvent-free poly(butene-1) particles from a solution of poly(butene-1) polymer and its monomer, butene-1, or other low boiling hydrocarbons.

Because of the high solubility of butene-1 polymers in saturated hydrocarbons, such as butane and heptane, and more particularly in unsaturated hydrocarbons such as its own monomer, butene-1 polymers generally are not readily separated from the reaction medium as is the case with polyethylene or polypropylene. Since butene-1 polymers have higher solubility characteristics than the other polyolefins, they are not easily precipitated after polymerization by cooling, since the cooling process generally produces a gel which is extremely difficult to dry, and excessive fractionation occurs. Use of a precipitant requires separation and recovery of the precipitant which is costly and requires additional processing steps for the polymers as well as some fractionation of the polymer. Prior to this invention an attempt had been made to separate the solvent from poly(butene-1) by heating the polymer-solvent solution and boiling the solvent therefrom. Utilization of this technique generally results in solid poly(butene-1) polymer that is unsatisfactory for further immediate processing. For example, the poly(butene-1) polymer so separated generally consists of large fluffy masses with low bulk densities which contain large quantities of monomer or solvent which have to be removed before the poly(butene-1) can be further processed. In addition, films and crusts of poly(butene-1) develop and form gelatinous masses which adhere to the walls of the treating vessels or collect at the bottom of the vessels in large unprocessable masses. Further, substantial quantities of solvent are retained by the poly(butene-1) which necessitates a separate devolatilization step before the polymer can be further processed. Devolatilization requires driers or heating devices which frequently causes deterioration of the poly(butene-1) because of the high temperatures required to release the entrapped monomer or solvent. Remelting and milling the polymer to release the solvent has been tried, but such processes are costly and also tend to deteriorate the poly(butene-1).

It is therefore an object of this invention to provide a method for separating poly(butene-1) from its solvent easily and efficiently in a solid particulate form. It is another object of this invention to provide a process for efficiently producing and separating flakes of poly(butene-1) polymer from a solution of poly(butene-1) and butene-1 monomer. Another object of this invention is to provide a continuous process for producing and separating flakes of essentially solvent free poly(butene-1) from a polymer solution in which the solvent is butene-1 or other low boiling hydrocarbon. Other objects and advantages of this invention will be apparent from the description and disclosure which follows.

The poly(butene-1) is obtained by polymerizing butene-1 with the so-called Ziegler organometallic type catalysts by a stereospecific polymerization using a variety of catalysts which normally are a combination of compounds of Groups IV through VIII transition elements in an oxidation state lower than the maximum, and metal hydrides or metal alkyls and the like. Such polymerization systems and the catalysts therefor are described in a number of literature sources, including the patent literature, and more comprehensively in such publications as Linear and Stereoregular Addition Polymer, Norman G. Gaylor and Herman F. Mark, 1959, Interscience Publications, Inc., New York, and the article appearing in the Petroleum Refiner, November 1960, Polyolefin Processes Today, Marshall Sittig.

Normally, compounds of metals of Groups IV through VI are employed with compounds of Groups I through III metals. High yields of isotactic polymer are obtained with the polyhalides of Groups IV and VI metals, particularly titanium tetrachloride, and the trichloride which may be derived from the tetrachloride, with alkyl aluminum compounds, including particularly alkyl aluminum halides, such as triethyl aluminum, tributyl aluminum, ethyl aluminum dichloride, diethyl aluminum chloride, ethyl aluminum sesquichloride and the like. The aluminum compound is normally used in molar excess to the titanium compound. The polymerization is normally conducted in a diluent with an amount of catalyst sufficient to provide the desired conversion to poly(butene-1) polymer. Although the polymerization of butene-1 may be conducted in the presence of inert diluents, it is preferred, for purposes of this invention, to conduct the polymerization reaction in only the butene-1 monomer. The amount of catalyst employed is normally from about 0.01 to about five percent of the butene-1 being polymerized. The polymerizations may be conducted, depending upon the particular catalyst system, over a wide range of temperatures but normally are conducted at temperatures within the range of about 30° C. to about 125° C., and at pressures below about 50 atmospheres. The resulting poly(butene-1) in butene-1 is then treated as by washing with water and/or alcohols to remove the catalyst and the poly(butene-1) solution is then treated in accordance with the process of this invention to isolate the polybutene.

The separation of the poly(butene-1) from the butene-1 monomer is effected by passing the polymer-monomer solution into a polymer separator which is an elongated tubular expander to which heat is applied, thereby vaporizing the butene-1 monomer and separating or precipitating the poly(butene-1) therefrom as separate polymer particles suspended in monomer vapor, which particles then drop out of the gas stream in a collector and the butene-1 vapor goes overhead. An essential feature of this invention requires that there be a gradual pressure change throughout the separator or expander during the solvent removal process at a rate of not greater than 10 p.s.i.g. decrease in pressure per foot length of the expander at a polymer-solvent velocity between 35 to 400 feet per second. Generally, the elongated tube-like expander will be at least 30 feet and up to about 400 feet in length, depending upon the volume of material to be handled. The cross sectional area of the outlet end of the expander will be at least three times the cross sectional area of the inlet end. Cross sectional area ratios of the expander's outlet end to the expander's inlet end of between 4 to 1 and 8 to 1 are preferred. Cross sectional area ratios in excess of 10 to 1 are to be avoided. The surface area of the expander must be sufficient to provide at least 50 to about 80 B.t.u.'s per pound latent heat of vaporization at overall heat transfer coefficients of between 5 to 25. The cross sectional area of the elongated tube-like expander is designed to obtain a minimum output velocity of 35 feet per second and a maximum output velocity of about 400 feet per second.

Output velocities of between 40 to 300 feet per second are preferred with better results being obtained at output velocities of between 50 to 120 feet per second. Too low an output velocity will cause the poly(butene-1) particles to coalesce and will cause an intermittent flow, resulting in foaming. Polymer such as this cannot be used for extruder feeds unless it is chopped and reduced in size. This is a costly operation and is unnecessary when output velocities above 35 feet per second are utilized. If too high an output velocity is used, the retention time of the polymer-monomer in the separator is so short that very little of the butene-1 monomer is removed therefrom. In this process, amounts of butene-1 retained in the polymer in excess of five percent is considered excessive, preferably being less than one percent. Not only does the retained butene-1 monomer constitute an economic loss, but it will vaporize during extrusion and cause the extrudate to foam and exit from the die in an erratic manner. Since standard vented extruders will remove amounts of butene-1 monomer of up to three percent, such retained amounts are acceptable. In this process substantially all of the butene-1 monomer is removed from the poly(butene-1), about one percent or less normally being retained in the polymer after being processed through the expander.

The heat should be applied evenly along the surface of the expander; otherwise, the effective length of the expander is reduced, a constant pressure differential is difficultly maintained, and hydrocarbon retention is excessive. To achieve the best operating conditions, the elongated tube type expander may be steam jacketed and steam introduced at a point near the outlet end of the expander. The steam introduced into the steam jacket surrounding the expander is at a temperature of between about 250° F. to 350° F. Preferably, the introduced steam temperature is at temperatures between 290° F. to 350° F. More preferably, the introduced steam temperature is at temperatures between 290° F. to 310° F. When temperatures in excess of 350° F. are used, for example at 440° F., the polymer particles tend to melt and cause undesirable plugging of the expander unit. At temperatures much below about 250° F., the temperature is not sufficient to maintain an even distribution of heat throughout the expander and maintain the required velocity of polymer and butene-1 through the expander. This causes fluctuations in the pressures maintained in the expander, as well as in the velocity of the polymer solution passing therethrough and also produces polymer particles generally undesirable for extrude use.

Certain relationships have been determined which, if observed, will aid in providing an expander possessing the necessary pressure differential or the pressure changes per linear foot of expander which is essential to the successful operation of this invention. It has been found that by applying the heat transfer formula, $q = UA\Delta t$, it is possible to design and size an expander for any given stream and obtain optimum operational efficiency. In this formula, $q$ represents the unit heat input required to maintain the desirable velocities within the conical type expander and is expressed in B.t.u.'s per pounds of polybutene-butene-1 solution per hour. $U$ represents the overall coefficient of heat transfer and is represented by B.t.u.'s per hour per square foot per degree Fahrenheit. $A$ is the internal unit surface area of the entire expander tube and is represented by square feet per pound of polybutene-butene-1 solution introduced. $\Delta t$ is the average temperature difference between the polymer stream and the steam in the jacket encasing the expander. It can be seen from this formula that the variables all cooperate in developing as well as in maintaining the critical pressure differential or pressure change and velocity which are essential in the operation of this invention.

As previously recited, a constant pressure change or a pressure differential of less than 10 p.s.i.g. per foot length of tube expander is essential to the operation of this invention. Although a pressure drop of between 0.33 p.s.i.g. and 7 p.s.i.g. per foot length of expander may be used, a pressure drop of between one p.s.i.g. and five p.s.i.g. per foot length of expander is preferred.

The polymer solution introduced into this expander system will consist primarily of poly(butene-1) and butene-1 monomer; however, copolymers of butene-1 and other solvents may be used. Where copolymers are utilized, butene-1 is normally the predominant comonomer. Generally, the polymer concentration in solution utilized in this invention will be less than 20 percent by weight of polymer in the monomer, with polymer concentrations of between about 5 to 15 percent by weight being preferred. This preferred concentration may be obtained by either diluting the more concentrated polymer solutions with the desired amount of monomer prior to its introduction into the expander or by controlling the rate of polymerization when the monomer is used as the solvent. The temperature at both the inlet and outlet portions of the expander is critical. The pressure differential is obtained by maintaining the liquid poly(butene-1) in butene-1 solution at its point of entrance into a 60-foot expander at an inlet temperature of between 150° F. to 300° F. and at an inlet pressure of between 200 p.s.i. to 300 p.s.i. with an outlet temperature of about 100° F. to 230° F. and an outlet pressure of between one p.s.i. to seven p.s.i. while maintaining the polymer solution at a relatively constant velocity of between 40 feet per second to 300 feet per second. An inlet temperature of between 180° F. to 250° F. and an inlet pressure of between 220 and 280 p.s.i. with an outlet temperature of between 115° F. and 180° F. and an outlet pressure of between one to five p.s.i.g. are preferred while maintaining the polymer solution at a velocity of between 50 to 120 feet per second. In the case of copolymers, the inlet pressure is somewhat higher generally.

By application of the previously described heat transfer formula, it was found that a pressure drop of less than 10 p.s.i.g. per foot of expander may be obtained by employing a tube of the necessary dimensions and heat transfer coefficients. However, this invention is not intended to be limited to any one particular design, for the same desirable results may be obtained with a variety of other designs. For example, an expander designed in the shape of a frustum with the frustum's outlet end having a cross sectional area at least three times as great, but less than ten times as great, as the frustum's inlet end may be used in the practice of this invention. The more gradual the change of cross sectional areas, the more efficient is the expander's operation. Obviously, sudden maximum changes in cross sectional area are to be avoided. The choice of cross sectional areas depends to a large degree on the amount of monomer present in the polymer solution, the temperatures utilized in removing the monomer therefrom, and the total volume of polymer solution introduced into the expander. It has also been found that an expander formed from various lengths of pipe having different diameters has been extremely effective in the operation of this invention. For example, in a semi-works plant an expander of three 20-foot lengths of ½" tubing, ¾" tubing, and 1" tubing that have been joined was very effective with feed ratios of about 3.3 gallons per minute of polymer solution. This particular type expander was steam jacketed and was maintained at the desirable operating temperatures by introducing 50 p.s.i. steam near the outlet portion of the expander. Obviously, as the input rate of polymer is increased, the diameter would also be proportionately increased. A large commercial expander would consist of three 115 foot sections, 2½ inch, 4 inch and 5 inch in diameter. Satisfactory results may be obtained by modifying any of the above described devices so long as the recommended pressure change and flow rate are maintained on the system. For example, the semi-works expander may be modified by combining 10-foot lengths of ½", ⅝", ¾", ⅞", 1" and ⅞" tubing, which if continued, would approach a frustum design. Although the length of the tube required may also be varied over wide limits, the lengths generally required will depend upon the rate at which the polymer solution is being introduced. In the separator very sharp bends or corners should be avoided to eliminate flow restrictions.

A stream of hot inert gas may be introduced at the outlet portion subsequent to the exit line of the vaporized monomer to remove remaining solvent or butene-1 monomer present in the solid polymer; however, the introduction of this gas is not essential to the operation of this invention, as small amounts of butene-1 may be removed by any standard vented extruder.

The vaporized butene-1 released in the expander is passed overhead to filters or to a cyclone separator to remove any poly(butene-1) fines that may be carried overhead. The butene-1 is then recirculated and condensed for either feed for further polymerization or as a diluent for the poly(butene-1) prior to its introduction into the expander. In the examples to follow, the following type expander was utilized. A 20-foot long ½" diameter piece of tubing was joined to a 20-foot long ¾" diameter piece of tubing, joined to a 20-foot long piece of 1" diameter tubing and terminated with a 1½" piece of pipe which led into a space separator-collector. The above described expander was encased in a 2" piece of pipe which contained a steam inlet point at the outlet portion of the tube expander and an outlet steam point at the inlet end of the tube expander. This separator had an overhead line to remove the separated monomer and a second line carrying the solid polymer which drops out to an extruder.

A polymer solution consisting of 10.4 percent poly(butene-1) and 89.6 percent butene-1 monomer was introduced into the expander at a temperature of about 170° F. and a pressure of about 200 p.s.i.g. The steam jacket temperature was maintained at 274° F. by means of 30 p.s.i. steam. The polymer solution was introduced at a rate of 1.8 gallons per minute with the outlet portion of the expander being maintained at a temperature of 125° F. and a pressure of 9 p.s.i. A constant gas velocity of 65.8 feet per second was maintained. A pressure differential or change of between 3.0 and 3.2 p.s.i.g. per linear foot of expander was maintained. Analysis of the solid poly(butene-1) produced in this example showed that 1.6 percent of butene-1 was retained in the poly(butene-1) which had a bulk density of 10.1 pounds per cubic foot. The poly(butene-1) produced was in the form of flakes having dimensions of about ¼" x ⅟₁₆". These flakes were readily fed into a devolitalizing extruder, chopped into small grains and packaged. When the run was repeated with a pressure drop above 10 p.s.i.g. per linear foot of expander, substantial quantities of butene-1 were retained in the poly(butene-1).

In another run, a polymer solution of 10 percent poly(butene-1) and 90 percent butene-1 was introduced into the expander at a temperature of 195° F. and at a pressure of 270 p.s.i. Steam was fed into the steam jacket at a pressure of 50 p.s.i. and a temperature of 297° F. The polymer solution was fed into the expander at a feed rate of 3.3 gallons per minute. Under these feed conditions, an outlet pressure of 5 p.s.i. and an outlet temperature of 135° F. were maintained. A pressure change or differential of 3.4 to 4.8 p.s.i. per linear foot of expander was maintained. The gas velocity was maintained constant at a rate of 330 feet per second. The poly(butene-1) particles collected from the separator were found to have a bulk density of 9 pounds per cubic feet and contained three percent butene-1. The solid poly(butene-1) was in the form of ⅜" balls.

A solution of poly(butene-1) in butene-1 is difficult to process and the isolated polymer will have low bulk density and high butene-1 content unless processed under conditions where a pressure change of below 10 p.s.i.g. per linear foot of expander is maintained and the inlet temperature is about 150° F. to 300° F., the outlet temperature is between about 100° F. to 230° F. and the gas velocity is about 35 to 300 feet per second to provide poly(butene-1) substantially free of monomer and of a high bulk density so that the poly(butene-1) may be introduced directly into an extruder without requiring further processing.

A polymer solution containing 14.0 percent poly(butene-1) and 86 percent butene-1 monomer was introduced into the expander at a feed rate of 2.2 gallons per minute and at a temperature and pressure of 195° F. and 275 p.s.i.g. respectively. The steam jacket temperature was maintained at 259° F. by the use of 20 p.s.i. steam. The outlet pressure and temperature of the expander obtained were 2 p.s.i.g. and 40° F. respectively. A constant gas velocity of 7.2 feet per second was maintained. The mean pressure differential varied under these conditions. On analyzing the solid poly(butene-1) polymer produced, it was found that over 60 percent by weight of the polymer mass consisted of butene-1. The product itself was a sticky polymeric mass.

We claim:
1. A process for separating a butene-1 polymer in particulate form from a solution of butene-1 polymer in a hydrocarbon solvent which comprises passing the polymer solution in which the butene-1 polymer is present in amounts of less than 20 percent by weight of polymer solution through a heated elongated tube expander having an inlet and outlet end in which the cross sectional area of the outlet end of the expander is at least three times that of the inlet end of the expander and maintaining a pressure change of less than 10 p.s.i.g. per linear foot of expander while maintaining a vapor-polymer velocity of between 35 to 400 feet per second therethrough.

2. A process for producing and separating particles of butene-1 polymer from a solution of less than 20 percent butene-1 polymer in butene-1 monomer which comprises passing the polymer solution through a heated elongated tube expander having an inlet and outlet end in which the cross sectional area ratios of the outlet end of the expander to the inlet end of the expander are between about 4 to 1 and 8 to 1 and maintaining a pressure change of 1 to 5 p.s.i.g. per linear foot of expander while maintaining a vapor-polymer velocity of between 50 to 120 feet per second therethrough.

3. A process for producing and separating flakes of poly(butene-1) from a solution of poly(butene-1) and butene-1 in which the butene-1 polymer is present in amounts of above 5 to 15 percent by weight of the polymer solution which comprises passing said poly(butene-1) and butene-1 through a steam jacketed elongated tube expander in which the cross sectional area ratios of the outlet end of the expander to the inlet end of the expander are between about 4 to 1 and 8 to 1 at a velocity of between about 40 to 300 feet per second while maintaining the inlet end of the tube at a temperature of between 150° F. to 300° F. and a pressure of between 200 p.s.i.g. to 300 p.s.i.g. and maintaining the outlet end of the tube at a temperature of between 100° F. to 230° F. and a pressure between one p.s.i.g. to 7 p.s.i.g. whereby a pressure change of 1 to 5 p.s.i.g. per linear foot of expander is maintained.

4. A process for producing and separating flakes of poly(butene-1) from a solution of poly(butene-1) and butene-1 in which the poly(butene-1) is present in amounts of between 5 to 15 percent by weight of the poly(butene-1) solution which comprises passing said poly(butene-1) solution through a steam jacketed elongated tube expander having an inlet and outlet end in which the cross sectional area ratios of the outlet end of the expander to the inlet end of the expander are between about 4 to 1 and 8 to 1 at a butene-1 vapor-poly(butene-1) velocity of between about 50 to 120 feet per second at a pressure change of about 1 to 5 p.s.i.g. per linear foot of tube while maintaining the inlet end of the tube at a temperature of between 180° F. to 250° F. and a pressure of between 220 p.s.i.g. to 280 p.s.i.g. and the outlet end of tube at a temperature of between 115° F. to 180° F. and a pressure between one p.s.i.g. to 5 p.s.i.g.

No references cited.

JOSEPH L. SCHOFER, *Primary Examiner.*

L. EDELMAN, *Assistant Examiner.*